April 3, 1928.

A. F. O'CONNOR 1,665,188

CHAIN ANCHOR FOR BRAKE GEARS

Filed Feb. 14, 1927  2 Sheets-Sheet 1

Inventor
Arthur F. O'Connor

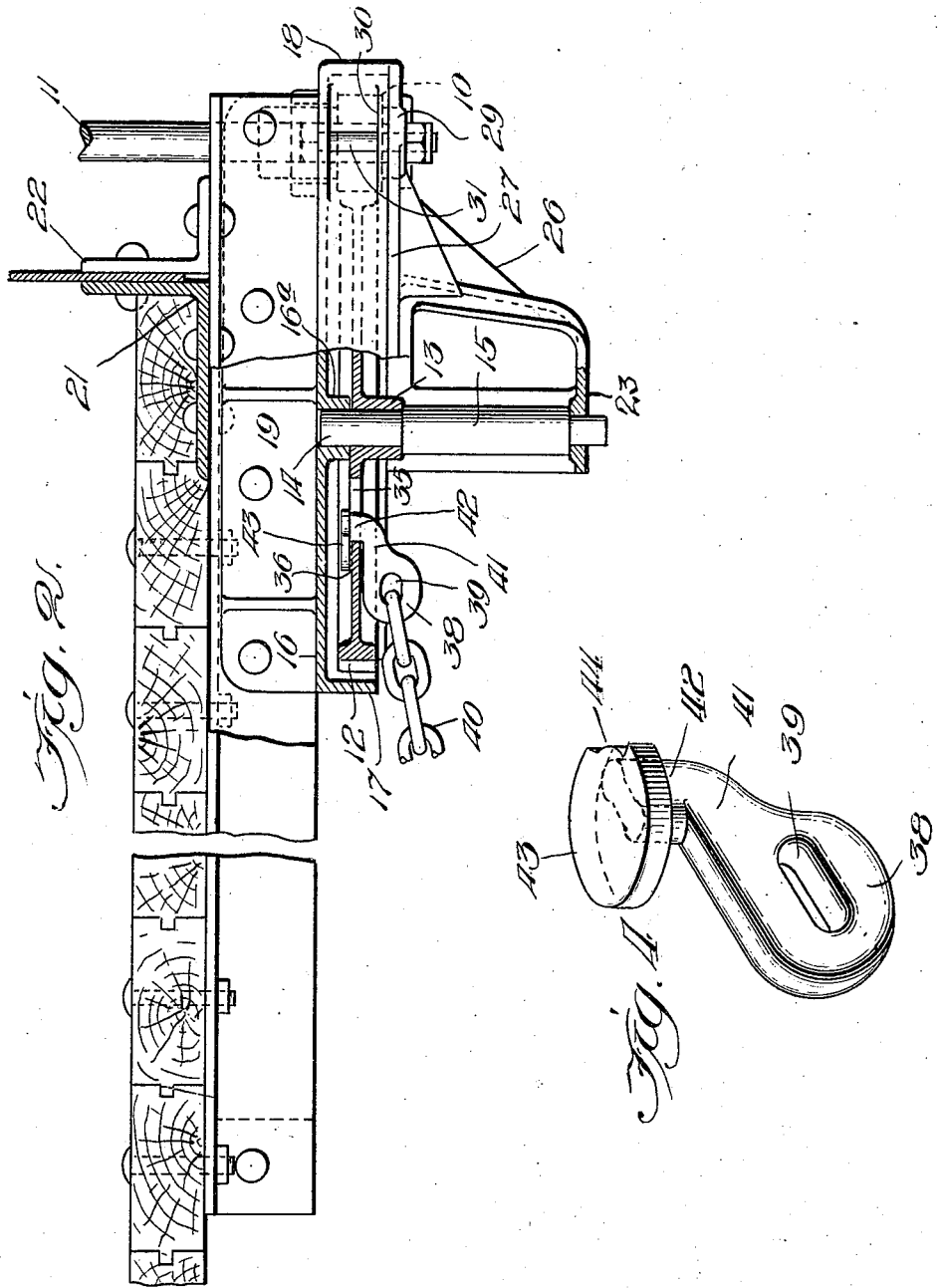

Patented Apr. 3, 1928.

1,665,188

UNITED STATES PATENT OFFICE.

ARTHUR F. O'CONNOR, OF CHICAGO, ILLINOIS, ASSIGNOR TO UNION RAILWAY EQUIPMENT COMPANY, OF CHICAGO, ILLINOIS, A CORPORATION OF ILLINOIS.

CHAIN ANCHOR FOR BRAKE GEARS.

Application filed February 14, 1927. Serial No. 167,930.

In the modern construction of hand brakes for freight cars, it is required that gearing be provided to enable the hand brake to apply a braking power equal to that afforded by air brakes, and to meet this requirement, gears have been employed for transmitting power from the hand wheel shaft to the chain winding drum with a view of increasing the power ratio to the required degree. In these circumstances, it is customary to secure the brake chain to some portion of the large gear, which is the winding element in the gear train, and in order to provide for a quick take up of the slack in the chain, so that the effective setting of the brakes may quickly follow, it is desirable that the brake chain be secured to some portion of the large winding gear at some distance from its axis, so that a partial rotation only of the large gear is required in order to take up the slack.

The present invention is directed to the means provided for securing the winding end of the brake chain to the winding gear in such a way as to prevent the fouling or cramping of the chain, which sometimes occurs where one of the links of the chain has been attached to a lug or lugs depending from the web of the winding gear. This has been due to the fact that no adequate provision has been made for permitting a swiveling action of the connection to permit the chain always to extend directly in the line of pull irrespective of the rotation of the gear wheel in drawing the chain around the drum.

The present invention is designed to afford such a swiveling action, and, at the same time, to make provision for the easy and convenient engagement or removal of the chain from the gear wheel by suitable manipulation, and at the same time to guard against accidental displacement of the parts.

In the drawings:

Fig. 2 is a view partially in section, the sectioned portion being taken on line 2—2 of Fig. 1;

Fig. 4 is a perspective view of the hooked chain connection of the present invention.

Figure 1:
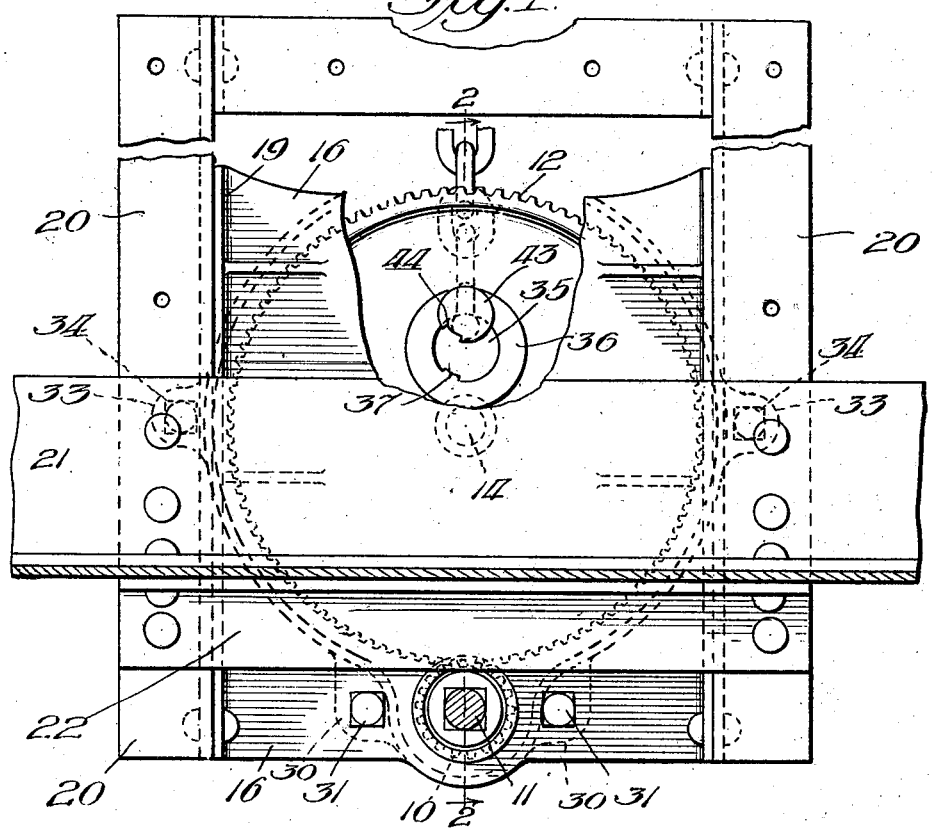
Figure 1 is a plan view of the gear assembly of the present invention, partially broken away to show the position of the chain and hooked connection therefor.
Figure 3:
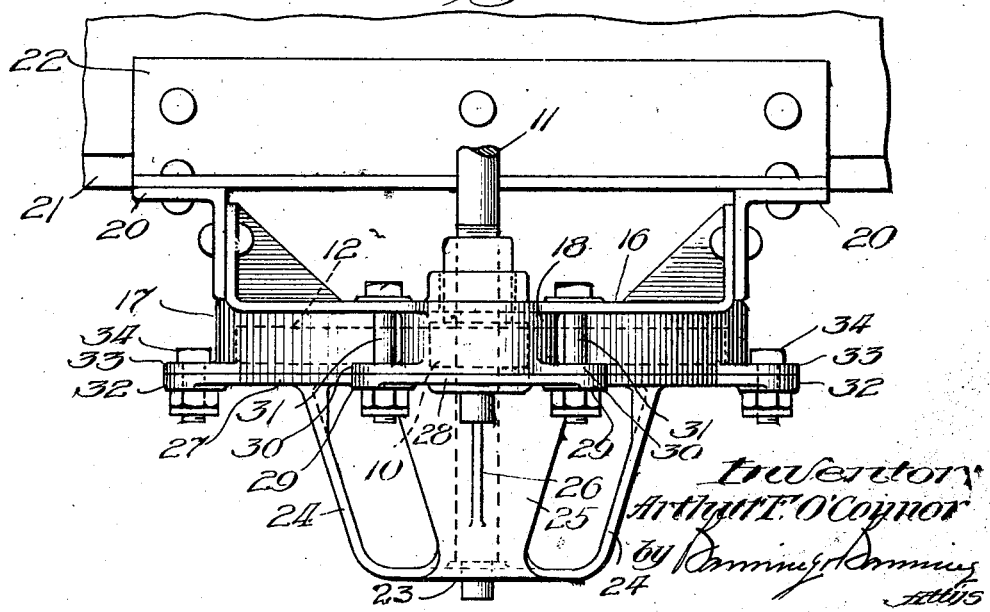
Fig. 3 is a front view of the gear assembly.

The gear assembly as a whole comprises a driving pinion 10 mounted upon the squared lower end of the hand brake shaft 11, which pinion meshes with a large winding gear 12 provided with a hub 13, which is preferably freely mounted upon the reduced upper end 14 of a winding drum 15. Although it is preferred to have the gear freely mounted upon the winding drum, these parts may be keyed together, if desired. The gear and pinion are mounted within a gear housing open on its underside and comprising a top plate 16 provided with a peripheral flange 17, the general configuration of the flange being circular with a protrusion 18 at its medial forward side for the purpose of housing the small driving pinion.

The top plate 16 of the gear housing, as shown, is of rectangular formation and provided along each of its side edges with an upstanding flange 19, which flanges are bolted between the downwardly extending flanges of a pair of spaced sills 20 which extend beneath and are bolted to the front cross sill 21 of the car. A reinforcing angle plate 22 is located within the angle between the front of the cross sill and the protruding front ends of the longitudinal sills 20 to provide additional securement and reinforcement at this point. The front edge of the housing top lies flush with the front ends of the longitudinal sills 20 and the brake shaft extends downwardly through the housing top at a point in advance of the reinforcing angle plate 22, as indicated in Fig. 1.

The lower reduced end of the drum shaft 15 is journaled through the web 23 of a hanger bracket comprising side legs 24 and a medial front leg 25 reinforced by a rib 26, which legs at their upper ends merge into a substantially half circular rim 27 provided in its center front with an extension 28, configured to underlie the protruding wall flange 18 of the gear housing, and having laterally disposed lugs 29 to register with similarly positioned lugs 30 on the gear housing to which it is connected by means of vertical bolts 31, which also extend upwardly through the top wall of the housing. The main portion of the bracket rim follows the curvature of the main portion of the gear housing, and the rim is provided near each end with an outwardly projecting ear or lug 32 which registers with a similarly positioned lug 33 formed at each side of the gear housing, bolts 34 being provided to unite the parts together.

The anchor which more particularly forms the subject matter of the present invention will now be described in detail. The winding gear 12 has formed within its web, at a point near the hub, an aperture 35 of generally circular formation surrounded on the upper side by a slightly elevated boss 36, which circular aperture is interrupted at one side by an inwardly extending lug 37.

The aperture affords a mounting for the anchor which consists of a loop portion 38 provided with an elongated opening 39 adapted to receive the terminal link of the brake chain 40. The loop portion of the anchor terminates in a forwardly extending shoulder 41 which merges into an upwardly extending neck 42 of substantially less diameter than the aperture 35, which neck in turn carries a disk shaped head 43 of slightly less diameter than the aperture and provided on its edge, at a point slightly to one side of the neck 42, with a notch 44 adapted when the anchor is being inserted to register with the lug 37. By bringing the lug and notch into register, the head of the anchor may be slipped upwardly through the aperture after which the weight of the chain will serve to hold the anchor in decentered relation with respect to the aperture, as indicated in Fig. 1, the head of the anchor, in conjunction with the shoulder and neck, constituting a hook which bears against the circular rim of the aperture for holding the parts in assembled relation.

In use, with the parts assembled as indicated, when the brakes are to be applied, the brake shaft will be rotated by the usual hand wheel (not shown) which will impart a relatively slow movement to the winding gear wheel. However, the slack in the chain will be quickly taken up by reason of the fact that the tension will be exerted from a point radially distant from the axis of the winding gear. As the latter rotates, as, for instance, in an anti-clockwise direction, the anchor will be maintained always in the line of draft established by the pull of the chain, and the neck of the anchor will roll upon the edge of the aperture as the latter revolves around the axis of the gear, so that a swiveling or turning of these parts with respect to one another will be occasioned, and this will prevent any kinking, cramping or fouling of the anchor chain, and will maintain the links of the latter in direct relation to the line of draft at all times.

As the anchor is carried around with the gear, the chain will swing freely until its forward end is brought into contact with the drum 15, after which the continued rotation of the gear wheel will swing the forward end of the chain around the drum and ultimately impart the necessary tension to set the brakes. If more than a single rotation of the gear wheel is required to set the brakes, the successive turns or convolutions of the chain around the drum will be evenly laid on in spiral relation to one another, and by mounting the drum for free rotation with respect to the gear, the drum will afford a rolling contact for the convolutions of the chain, which is deemed a better method of handling the chain than by means of a drum which is keyed to or rigidly united with the gear.

The anchor is in effect a modified hook particularly designed to co-operate with the winding gear under the conditions indicated, and the head of the anchor is so configured as to permit it to be readily inserted into or removed from the aperture by suitable manipulation. However, the parts are so configured and related that when the anchor has been inserted, the pull of the chain will set the hook and prevent accidental displacement, and the relation of the lug 37 to the notch 44 is such that as the gear is rotated, these parts will recede more and more from registering relation, so that under no conditions can the chain become disconnected.

Although the invention as a whole has been defined with considerable particularity, it is not the intention, unless otherwise indicated in the claims, to limit the device to the particular construction shown, since the same is susceptible of considerable modification without departing from the spirit of the inventon, nor is it the intention to limit the invention to a winding gear having a solid web, since obviously the web might be perforated or assume the configuration of spokes, without substantial change in the relationship of the parts hereinbefore indicated.

I claim:

1. In a chain anchor for brake gears, the combination of a winding gear provided with a decentered aperture, means for imparting rotation thereto, a drum with which the gear is associated, a brake chain, and a hook-like member connected with the chain and having its free end entered through said aperture, substantially as described.

2. In a chain anchor for brake gears, the combination of a winding gear provided with a decentered aperture, means for imparting rotation thereto, a drum with which the gear is associated, a brake chain, and a hook-like member connected with the chain and having its free end entered through said aperture, said free end being configured to permit passage through said aperture in one position only, substantially as described.

3. In a chain anchor for brake gears, the combination of a winding gear provided with a decentered aperture for imparting rotation thereto, a drum with which the gear is associated, a brake chain, and a hook-like member connected with the chain and having its free end entered through said aperture, said free end being enlarged and configured to permit the passage through the aperture in one position only; and adapted under the tension of the chain to be held out of co-incidental registering relation with said aperture, substantially as described.

4. In a chain anchor for brake gears, the combination of a winding gear provided with a decentered aperture, a driving pinion meshing with the winding gear, a shaft for imparting rotation to said pinion, a winding drum upon which the winding gear is centrally mounted, journal mountings for the gear, pinion and drum, a hook-like anchor comprising a loop portion terminating in a neck, and a dish-like head protruding laterally and rearwardly from the neck, a brake chain having one of its links entered through the loop, the relation of the head to the aperture being such as to permit passage of the head therethrough when in registering relation only and the weight of the chain serving to hold the neck in engagement with the periphery of the aperture when in use, substantially as described.

5. In a chain anchor for brake gears, the combination of a winding gear provided with a decentered generally circular aperture, a driving pinion meshing with the winding gear, a shaft for imparting rotation to said pinion, a winding drum upon which the winding gear is centrally mounted, journal mountings for the gear, pinion and drum, a hook-like anchor comprising a loop portion terminating in a neck of reduced diameter, and a disk-like head protruding laterally and rearwardly from the neck, a brake chain having one of its links entered through the loop, the relation of the head to the aperture being such as to permit passage of the head therethrough when in registering relation only, and the weight of the chain serving to hold the neck in rolling engagement with the periphery of the aperture when in use, substantially as described.

6. In a chain anchor for brake gears, the combination of a gear provided with a decentered aperture, means for imparting rotation to the gear, a brake chain, and an anchor member connected with the chain and having swiveling engagement with respect to the aperture of the gear, substantially as described.

7. In a chain anchor for brake gears, the combination of a rotatable shaft, gear carried by said shaft, a pinion for rotating said gear, a hook like anchor in hooked engagement with said gear, a chain, and means for securing a link of said chain to said anchor, said chain being mounted so as to be wound around said shaft after initial rotation of said gear, substantially as described.

ARTHUR F. O'CONNOR.